(12) United States Patent
Tsuji et al.

(10) Patent No.: US 8,720,227 B2
(45) Date of Patent: May 13, 2014

(54) CONVEYANCE ASSISTING DEVICE OF GLASS RIBBON

(75) Inventors: Tomokazu Tsuji, Minamikawachi-gun (JP); Takanori Mifuji, Sakai (JP); Nobuhisa Tanise, Osakasayama (JP); Kinji Masui, Osakasayama (JP)

(73) Assignee: Central Glass Company, Limited, Ube-shi (JP)

( * ) Notice: Subject to any disclaimer, the term of this patent is extended or adjusted under 35 U.S.C. 154(b) by 628 days.

(21) Appl. No.: 12/740,546

(22) PCT Filed: Oct. 16, 2008

(86) PCT No.: PCT/JP2008/068697
§ 371 (c)(1),
(2), (4) Date: Apr. 29, 2010

(87) PCT Pub. No.: WO2009/057450
PCT Pub. Date: May 7, 2009

(65) Prior Publication Data
US 2010/0242546 A1    Sep. 30, 2010

(30) Foreign Application Priority Data
Nov. 1, 2007  (JP) .................... 2007-284788

(51) Int. Cl.
*C03B 13/16* (2006.01)

(52) U.S. Cl.
USPC ......... 65/91; 65/90; 65/99.5; 65/199; 65/200; 65/201; 65/370.1

(58) Field of Classification Search
USPC ............ 65/90, 91, 199–201, 370.1, 99.5
See application file for complete search history.

(56) References Cited

U.S. PATENT DOCUMENTS

| | | | |
|---|---|---|---|
| 4,058,200 A * | 11/1977 | Frank | 198/382 |
| 4,341,546 A | 7/1982 | Nitschke et al. | |
| 4,390,358 A | 6/1983 | Frielingsdorf | |
| 4,475,937 A | 10/1984 | Nitschke | |

(Continued)

FOREIGN PATENT DOCUMENTS

| CN | 1654385 A | 8/2005 |
|---|---|---|
| CN | 2883363 Y | 3/2007 |

(Continued)

OTHER PUBLICATIONS

International Search Report dated Nov. 25, 2008 with English translation (Five (5) pages).

(Continued)

*Primary Examiner* — Queenie Dehghan
(74) *Attorney, Agent, or Firm* — Crowell & Moring LLP

(57) ABSTRACT

In a glass-ribbon conveyance assisting device which is applied to a glass-ribbon conveyance device configured to convey a glass ribbon on a plurality of rotating glass-conveyance rolls, the glass-ribbon conveyance assisting device includes a rotary drive section, a plurality of rolls configured to be rotated by the rotary drive section, an annular belt configured to rotate while running with flexion under a state where the rolls have been inserted into the belt, and a wheel configured to press the glass ribbon which is conveyed on the belt. The glass ribbon is conveyed on the belt by a drive of the belt under a state where width-directional both end portions of the glass ribbon are sandwiched between the belt and the wheel.

4 Claims, 2 Drawing Sheets

(56) References Cited

U.S. PATENT DOCUMENTS

| | | | |
|---|---|---|---|
| 6,698,243 B1 * | 3/2004 | Yoshizawa | 65/104 |
| 7,080,766 B2 * | 7/2006 | McEntee et al. | 225/96.5 |
| 2005/0274147 A1 * | 12/2005 | McMaster | 65/104 |

FOREIGN PATENT DOCUMENTS

| | | |
|---|---|---|
| EP | 1 739 062 A1 | 1/2007 |
| JP | 44-23828 | 10/1969 |
| JP | 57-156336 A | 9/1982 |
| JP | 57-170828 A | 10/1982 |
| JP | 59-88334 A | 5/1984 |
| JP | 4-184089 A | 7/1992 |
| JP | 7-10569 A | 1/1995 |
| JP | 2000-239035 A | 9/2000 |
| JP | 2003-306340 A | 10/2003 |
| JP | 2005-263602 | 9/2005 |

OTHER PUBLICATIONS

Form PCT/ISA/237 (Three (3) pages), Nov. 25, 2008.
Chinese Office Action with Japanese translation dated Feb. 24, 2012 (six (6) pages).

* cited by examiner

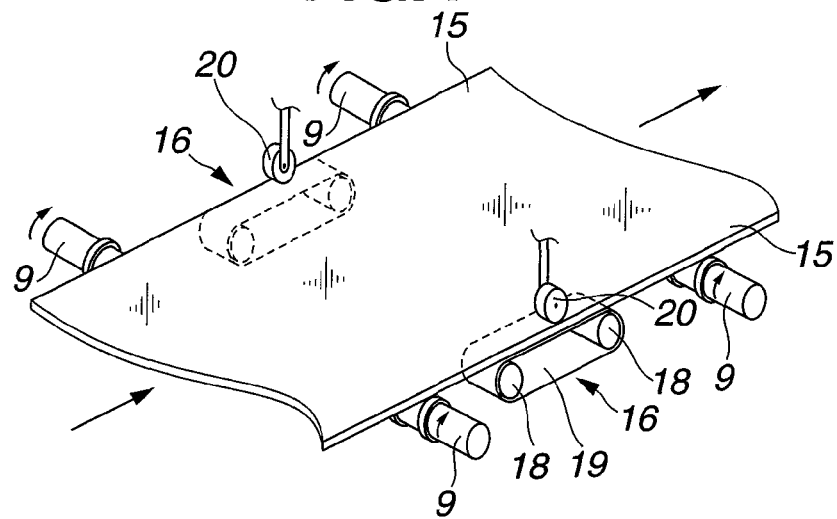
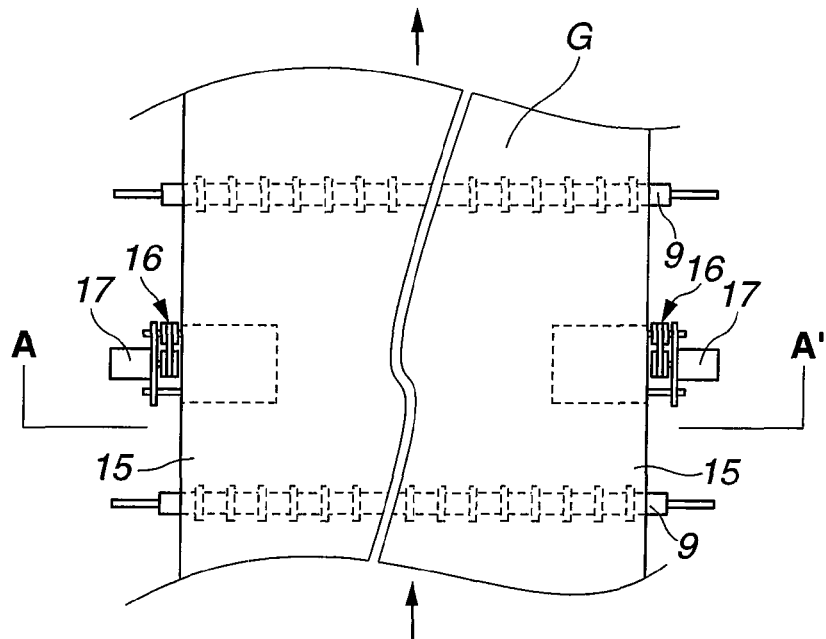
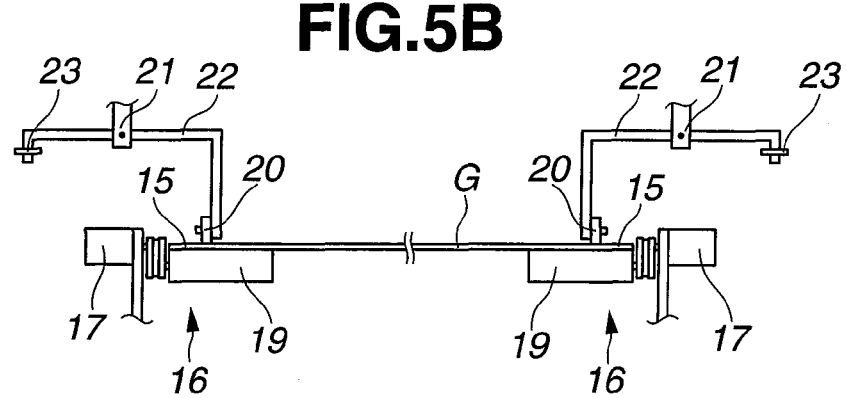

CONVEYANCE ASSISTING DEVICE OF GLASS RIBBON

TECHNICAL FIELD

The present invention relates to a conveyance assisting device of glass ribbon which is used when conveying a glass ribbon on glass conveyance rolls in a manufacturing facility of glass plate according to a float method, a fusion method, a roll-out method or the like. More particularly, the present invention relates to a conveyance assisting device of glass ribbon which is used when conveying a glass ribbon on glass conveyance rolls in a manufacturing facility of glass plate according to a float method for forming a glass substrate for liquid crystal display or a glass substrate for plasma display through cutting and edge grinding.

BACKGROUND OF THE INVENTION

The manufacturing facility of glass plate is provided for, e.g., the float method, the fusion method or the roll-out method. The manufacturing facility of glass plate for the float method is suitable for an effective manufacturing of large-size glass plate which is larger than one square meter.

The manufacturing facility of glass plate according to the float method will now be explained referring to drawings.

FIG. 1 is a schematic view of the manufacturing facility of glass plate according to the float method.

As shown in FIG. 1, in the manufacturing facility of glass plate according to the float method, a glass raw material charged from a material input port 1 is melted inside a glass melting furnace 2, and then is pushed out to become a molten glass 3. Then, the molten glass 3 spreads out into a float bath (tin bath) 5 filled with a molten tin 4, and becomes flattened. That is, when the molten glass 3 is introduced into the float bath 5 and is floated on the molten tin 4, the molten glass 3 is heated inside the float bath 5 by a heater 6 and thereby spreads out on the high-temperature molten tin 4. In detail, the molten glass 3 spreads spontaneously because of an equilibrium between a surface tension of molten glass 3 and a gravity, and thereby achieves a stable thickness of molten glass 3, in other words, achieves an equilibrium thickness.

As shown in FIG. 2, the molten glass 3 which has achieved the equilibrium thickness is lifted and pulled out by lift-out rolls 7. Then, the molten glass 3 is drawn and enlarged while the temperature of molten glass 3 is somewhat reduced, to become a glass ribbon G. Then, the glass ribbon G moves to the slow-cooling furnace 8.

As shown in FIGS. 1 and 2, normally, the slow-cooling furnace 8 is covered by a heat-insulation wall. The glass ribbon G which has moved into the slow-cooling furnace 8 is gradually cooled and conveyed by rotary drive of glass conveyance rolls 9, under a state where the glass ribbon G is located in contact with the glass conveyance rolls 9 inside the slow-cooling furnace 8. The glass ribbon G moves through a washing machine 10 and a drying machine 11 to a cutting machine 12. The glass ribbon G is cut into a desired size by the cutting machine 12, so that a desired glass plate is obtained.

Normally, a thickness of glass plate for building use such as a window glass is larger than or equal to 4.0 mm, and a conveying speed (moving speed) of this glass ribbon G is adjusted only by a rotational speed control of the glass conveyance rolls 9.

FIG. 3 is a horizontal cross-sectional view of one example of a manufacturing apparatus of glass plate according to the float method.

As shown in FIG. 3, in order to obtain the glass ribbon G which is thinner than its equilibrium thickness, normally, top rolls 13 press both width-directional end portions of the molten glass 3 in the float bath 5 so as to draw and enlarge the molten glass 3 in the width direction and thereby to thin the molten glass 3, as disclosed in a Patent Document 1. Each top roll 13 is formed with grooves and teeth, and presses the both width-directional end portions of molten glass 3 while being rotated by a motor 14 or the like.

For example, a Patent Document 2 discloses that each of the both end portions 15 of glass ribbon G given a tension by the top rolls 13 has a roll mark, and cannot be used for a product. Moreover, this Patent Document 2 discloses a method of relaxing a stress strain to reduce asperities of glass surface, by designing each of the both end portions 15 to have a degree of thickness equal to or slightly smaller than 3 mm which is thicker as compared with a glass ribbon's central portion having a thickness falling within a range from 0.1 mm to 1.5 mm and by designing each width of the both end portions 15 to be large.

Moreover, a Patent Document 3 written by the applicant of present application discloses a manufacturing method of float plate glass using the top rolls 13. This float plate glass is manufactured in order to be used for a substrate for plasma display, a substrate for liquid crystal display or the like.

The plasma display functions to display by causing lights at red, blue and green phosphors by means of electric discharge. Nowadays, a standard of thickness of the glass substrate for plasma display ranges from 1.8 mm to 2.8 mm. The liquid crystal display causes blinking of pixels by driving a liquid crystal panel by use of thin-film transistors (TFT system) or the like. The liquid crystal panel itself does not emit light, and needs backlight as its light source. A standard of thickness of the glass substrate for liquid crystal display is equal to 0.7 mm. Although the standard of thickness of the glass substrate for liquid crystal display was equal to 1.1 mm in past days, this standard has been developmentally changed to 0.7 mm in order to reduce a light leakage between pixels due to light interference and diffusion in the substrate, and in order to improve a resolution as liquid crystal panel and thereby to achieve a wide view angle. Moreover, a glass substrate which is used for a liquid crystal panel of mobile phone has a thickness equal to 0.4 mm as standard.

Moreover, as to the conveyance of glass ribbon inside the slow-cooling furnace and the like, a Patent Document 4 discloses a conveyance method of glass ribbon characterized as follows. In this glass-ribbon conveyance method, a high-temperature glass ribbon which is produced by the float method is taken out from a float bath and conveyed by conveyance rollers in order to prevent powdered tine, powdered glass and the like which are called "dross" from sticking to the glass ribbon from a melting bath, or in order to prevent a surface of glass ribbon from being scratched. Moreover, in this method, a suction lifting means for sucking the glass ribbon which has been taken out from the float bath, in a noncontact manner, to a space above the conveyance rollers is disposed so that the glass ribbon is conveyed under a state where all or part of the glass ribbon is lifted from the conveyance rollers. Thereby, the glass ribbon is conveyed by switching between a noncontact-conveyance operation of glass ribbon which is performed by the suction lifting means and a contact-conveyance operation of glass ribbon which is performed by the conveyance rollers, or by using the noncontact-conveyance operation in combination with the contact-conveyance operation, as needed basis.

Patent Document 1: Japanese Patent Application Examined Publication No. S44 (1969)-23828

Patent Document 2: Japanese Patent Application Publication No. H07 (1995)-10569

Patent Document 3: Japanese Patent Application Publication No. 2005-263602

Patent Document 4: Japanese Patent Application Publication No. 2000-239035

SUMMARY OF THE INVENTION

The thickness of glass plate for building use such as for window glass is larger than or equal to 4.0 mm. In a manufacturing facility of glass plate provided for a soda-lime silicate glass for window glass, the conveying speed of glass ribbon is adjusted only by controlling the rotational speed of the glass conveyance rolls which are rotationally driven.

However, in a case of the conveyance of a thin glass ribbon having a thickness falling within a range from 0.5 mm to 3.0 mm such as a glass substrate for liquid crystal display or a glass substrate for plasma display, if the glass ribbon is conveyed only by the rotary drive of glass conveyance rolls under the state where the glass ribbon is riding on the glass conveyance rolls, there has been the following problem. That is, since the glass ribbon is thin and light in weight, a slip between the glass conveyance rolls and the glass ribbon is caused so as to freely rotate the glass conveyance rolls. Thereby, the glass ribbon is possibly broken due to a trouble that the glass ribbon sags or snakes (moves in a winding manner).

Particularly, a high strain point glass such as a borosilicate glass which is used for the glass substrate for plasma display, and an alkali-free glass which is used for the glass substrate for liquid crystal display and which contains calcium and the like instead of sodium to prevent an occurrence of pixel defect due to sodium, are rigid and easy to be damaged at the time of sag.

It is an object of the present invention to provide a glass-ribbon conveyance assisting device which is added to glass conveyance rolls as conveyance assisting means in order to smoothly convey a glass ribbon to prevent a breakage of glass ribbon due to the sag or snaking movement when conveying the glass ribbon, and/or to provide a glass-ribbon conveyance method using the conveyance assisting device.

To solve the above problems, particularly in the manufacturing facility of glass plate according to the float method, it is more favorable that the glass-ribbon conveyance assisting device configured to adjust the conveying speed of glass ribbon by sandwiching a width-directional end portion of glass ribbon in upper and lower directions is provided in addition to the conveyance of glass ribbon which is conducted by the rotary drive of glass conveyance rolls, as the conveyance assisting means, in a region after the glass ribbon enters the slow-cooling furnace, more favorably, at an exit of slow-cooling furnace or in a region posterior to the exit of slow-cooling furnace.

Further, according to the present invention, in the manufacturing facility of glass plate according to the float method, the fusion method, the roll-out method or the like, there is provided a glass-ribbon conveyance assisting device which is added to the glass conveyance rolls as the conveyance assisting means when a belt-like (strip) glass ribbon taken out from the float bath, a glass melting furnace or the like is conveyed by the rotary drive of glass conveyance rolls under a state where the glass ribbon is placed on the glass conveyance rolls.

It is more favorable that the glass-ribbon conveyance assisting device according to the present invention is used as a glass-ribbon conveyance assisting device which is added to the glass conveyance rolls as the conveyance assisting means against the rotary drive of glass conveyance rolls functioning as conveying means, when the glass ribbon having a thickness falling within a range from 0.3 mm to 3.0 mm which is scheduled to become the glass substrate for liquid crystal display or the glass substrate for plasma display through the cutting and edge grinding is conveyed under the state where the glass ribbon is on the glass conveyance rolls in the glass manufacturing facility according to the float method.

Because a glass ribbon having a thickness falling within the rage from 0.3 mm to 3.0 mm which is for the glass substrate for plasma display or the glass substrate for liquid crystal display is thin and rigid, there is a possibility that the glass ribbon is broken due to, e.g., a trouble that the glass conveyance rolls rotate freely (slip) to cause the glass ribbon to sag or snake if the glass ribbon is conveyed only by the drive of glass conveyance rolls. Therefore, it is more favorable that the glass-ribbon conveyance assisting device according to the present invention which adjusts the conveying speed of glass ribbon by sandwiching the end portion of glass ribbon from upper and lower sides of glass ribbon is provided in an area in which the glass ribbon has been cooled down after entering the slow-cooling furnace, particularly at the exit of slow-cooling furnace or at a point posterior to the exit of slow-cooling furnace.

That is, according to first aspect of the present invention, there is provided a glass-ribbon conveyance assisting device which is applied to a glass-ribbon conveyance device configured to convey a glass ribbon on a plurality of rotating glass-conveyance rolls, the glass-ribbon conveyance assisting device comprising: a rotary drive section; a plurality of rolls configured to be rotated by the rotary drive section; an annular belt configured to rotate while running with flexion under a state where the rolls have been inserted into the belt; and a wheel configured to press the glass ribbon being conveyed on the belt, wherein the glass ribbon is conveyed on the belt by a drive of the belt under a state where each of width-directional both end portions of the glass ribbon is sandwiched between the belt and the wheel.

Moreover, according to second aspect of the present invention, there is provided a glass-ribbon conveyance method in which a glass ribbon having a thickness falling within a range from 0.3 mm to 3.0 mm is conveyed on a plurality of rotating glass-conveyance rolls, the glass-ribbon conveyance method comprising: providing the above-mentioned glass-ribbon conveyance assisting device in addition to a rotary drive of the glass conveyance rolls configured to convey the glass ribbon under a state where the glass ribbon is on the glass conveyance rolls; sandwiching the glass ribbon by means of the conveyance assisting device; and adjusting a conveying speed of the glass ribbon by the conveyance assisting device.

As shown in FIG. 3, in the glass manufacturing facility according to the float method, in order to reduce the thickness of glass ribbon G, the top rolls 13 for enlarging the molten glass 3 are made to be in contact with an upper surface of the molten glass 3 spread out within the float bath 5, in a shape of 八 (Japanese character). Thereby, the molten glass 3 is drawn and enlarged by rotating the top rolls 13 so that thin glass ribbon G is formed. Thus, by drawing and enlarging the molten glass 3, the width-directional both end portions 15 of glass ribbon G remain to include thick portions having contact marks (trace) of the top rolls. The structure in which the thick both end portions 15 of the glass ribbon G cooled down inside the slow-cooling furnace 8, more preferably, of the glass ribbon G existing at the exit of slow-cooling furnace 8 are sandwiched by the glass-ribbon conveyance assisting device according to the present invention to adjust the conveying speed of glass ribbon G is remarkably effective in order to suppress the sag and the snaking movement of glass ribbon G and thereby to prevent the breakage of glass ribbon G. At this time, by setting a conveying speed of glass ribbon which is generated by the glass-ribbon conveyance assisting device according to the present invention at a value faster than a speed of outer circumference of roll generated by the rotary drive of glass conveyance rolls inside the slow-cooling furnace 8, the sag of glass ribbon is suppressed so that a tension can be applied to the glass ribbon within the slow-cooling furnace.

BRIEF EXPLANATION OF DRAWINGS

FIG. 4 An oblique perspective view for explaining a conveyance assisting device of glass ribbon, which adjusts a conveying speed of the glass ribbon.

FIG. 5A A top view of the glass ribbon which is conveyed by the glass-ribbon conveyance assisting device.

FIG. 5B A front view of the glass ribbon which is conveyed by the glass-ribbon conveyance assisting device, as viewed from a line A-A' of FIG. 5A.

DETAILED DESCRIPTION OF THE INVENTION

Figure 1:
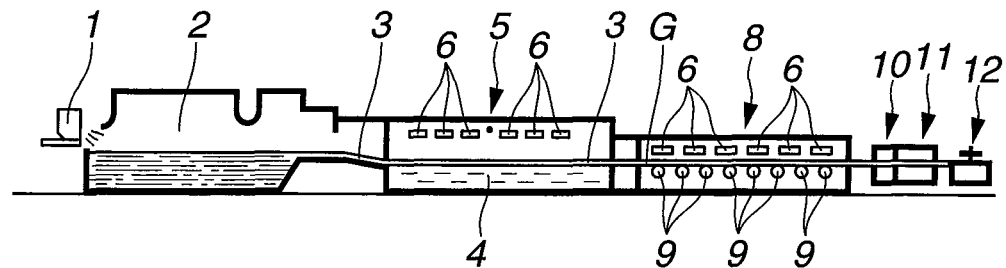
FIG. 1 A schematic view of a manufacturing facility of glass plate according to a float method.
Figure 2:
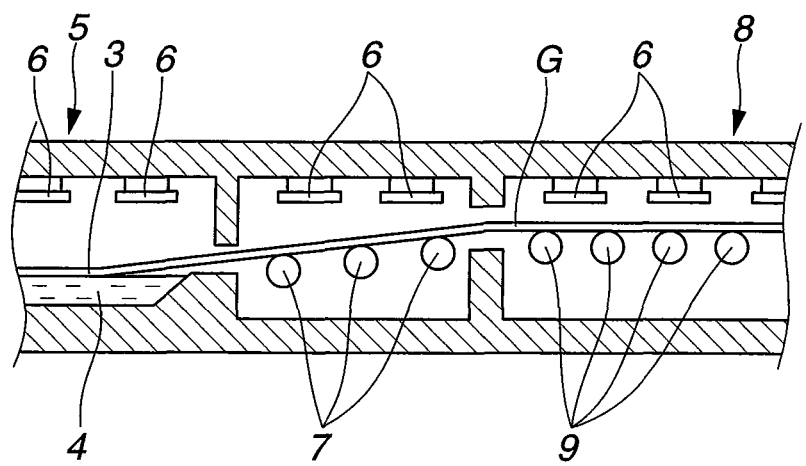
FIG. 2 A structural cross-sectional view showing a region in which a glass moves from a float bath to a slow-cooling furnace in the manufacturing facility of glass plate according to the float method.

Referring to the drawings, conveyance assisting device and method of glass ribbon according to the present invention will be explained below.

FIG. 4 is an oblique perspective view for explaining the conveyance assisting device of glass ribbon, which adjusts a conveying speed of the glass ribbon.

FIG. 5A is a top view of the glass ribbon which is conveyed or moved by the glass-ribbon conveyance assisting device. FIG. 5B is a front view of the glass ribbon which is conveyed by the glass-ribbon conveyance assisting device, as viewed from a line A-A' of FIG. 5A.

As shown in FIGS. 4, 5A and 5B, the conveyance assisting device 16 of the glass ribbon G according to the present invention is applied to a glass conveyance device functioning to move the glass ribbon G on a plurality of glass conveyance rolls 9 that rotate. The conveyance assisting device 16 includes a rotary drive section or means 17 such as a motor, a plurality of rolls 18, an annular belt 19, and a wheel 20. The plurality of rolls 18 are rotated by the rotary drive section 17. The annular belt 19 rotates while running with flexion (with flexibility) under a state where the rolls 18 have been inserted into the annular belt 19. The wheel 20 presses the glass ribbon G when the glass ribbon G is being conveyed under a state where the glass ribbon G is riding on the belt(s) 19. Both end portions 15 of glass ribbon G in a width direction of glass ribbon G are sandwiched between the belt 19 and the wheel 20, and thereby the glass ribbon G is conveyed on the belt 19 by a drive of the belt 19. According to the present invention, the width-directional both end portions 15 of glass ribbon G mean a range of 30 cm from both ends of the glass G, i.e., are defined by portions falling within the range of 30 cm from both ends of glass G.

Moreover, a conveyance method of glass ribbon using the conveyance assisting device 16 of glass ribbon G according to the present invention is a conveyance method for the glass ribbon G having a thickness ranging from 0.3 mm to 3.0 mm. In this method, the above-mentioned conveyance assisting device 16 of glass ribbon G is provided in addition to the rotary drive of glass conveyance rolls 9 that carry forward the glass ribbon G under the state where the glass ribbon G is on the glass conveyance rolls 9. Moreover, in this method, the glass ribbon G is sandwiched by the conveyance assisting device 16, and the conveying speed of glass ribbon G is adjusted by the conveyance assisting device 16.

In a case that the conveyance of thin glass ribbon G having a thickness falling within the range from 0.3 mm to 3.0 mm is performed by only the drive of glass conveyance rolls 9, there is a possibility that the glass ribbon G is broken due to a trouble that the glass ribbon G sags or snakes (moves in a winding manner) because the glass ribbon G is thin. In order to suppress the break of glass ribbon G which is caused due to the trouble such as the sag of glass ribbon G and the snaking movement of glass ribbon G, it is favorable that the glass-ribbon conveyance assisting device 16 according to the present invention which adjusts the conveying speed of glass ribbon G by sandwiching the end portions of glass ribbon G in upper and lower directions is provided to be applied to the glass ribbon G already cooled inside the slow-cooling furnace 8, more preferably, to be applied to the glass ribbon G existing in an exit area of the slow-cooling furnace 8. If the glass-ribbon conveyance assisting device 16 according to the present invention is provided in a region in which the glass ribbon G exists in a still hot state after an entry to the slow-cooling furnace, there is a risk that the belt 19 formed of a rubber such as silicon rubber is damaged. Moreover, the glass-ribbon conveyance assisting device 16 according to the present invention is provided at the exit of slow-cooling furnace 8 so as to be applied to the width-directional both end portions of glass ribbon G, and a conveying speed (for glass ribbon G) caused by the conveyance assisting device 16 is made faster than an outer circumferential speed of roll caused by the rotary drive of the glass conveyance rolls 9 inside the slow-cooling furnace 8. Accordingly, it is suppressed that a slip is generated between the glass ribbon G and the glass conveyance rolls 9 and thereby, e.g., the glass conveyance rolls 9 spin free (rotate loosely) so as to cause the sag of glass ribbon G. Therefore, it becomes possible that the glass ribbon G is stretched (tension is applied to the glass ribbon) within the slow-cooling furnace 8, so that there is an advantage that the break of glass ribbon G is remarkably reduced.

Figure 3:
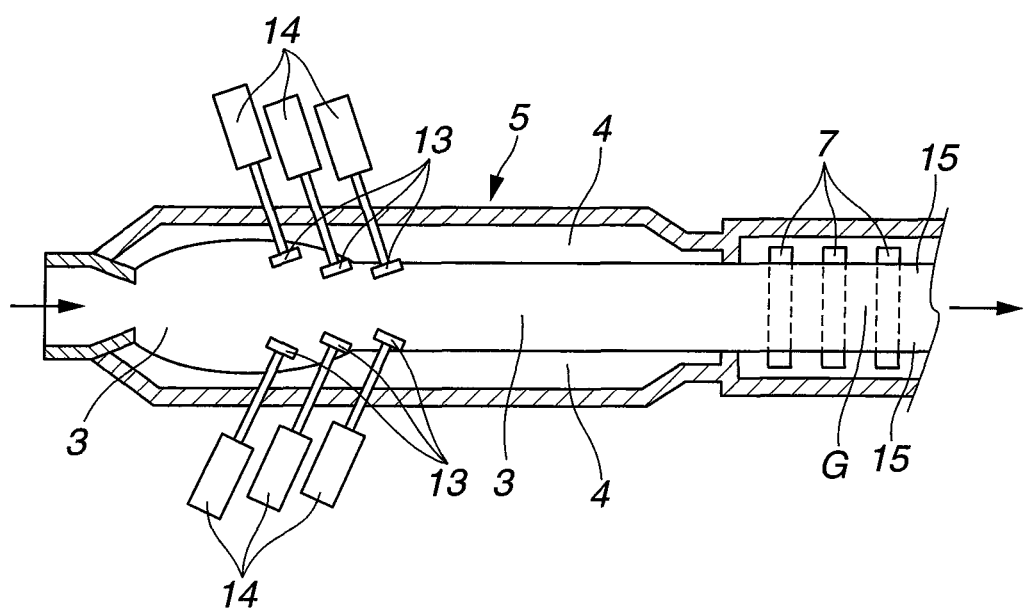
FIG. 3 A horizontal cross-sectional view of one example of a manufacturing apparatus of glass plate according to the float method.

As shown in FIG. 3, in the glass manufacturing facility according to the float method, in order to reduce the thickness of glass ribbon G, the top rolls 13 for enlarging the molten glass 3 is made to be in contact with an upper surface of the molten glass 3 spread out into the float bath 5, in a shape of (Japanese character) as viewed from above the molten glass 3. Thereby, the molten glass 3 is drawn and enlarged by rotating the top rolls 13 in a direction toward an outer circumference of float bath 5 so that the thin glass ribbon G is formed. Thus, since the molten glass 3 is drawn and enlarged, the both end portions 15 of glass ribbon G remain thick or include thick glass portions.

In order to avoid the break of glass ribbon G, each of these thick both end portions 15 is sandwiched by using the belt 19 formed of silicon or the like, the rolls 18 for driving the belt 19 and the wheel 20 for pressing the end portion 15 from above, as shown in FIGS. 4, 5A and 5B. The belt 19 is used for the reason that a contact area between the belt 19 and the glass ribbon G is large and thereby a drive force derived from the rolls 18 is reliably transmitted to the glass ribbon G by means of friction. It is favorable that a silicon belt is used as the belt 19 in order to smoothly transmit the drive to the glass ribbon G without a slip between the glass ribbon G and the belt 19. The silicon belt has a large friction with the glass ribbon G, and has a high flexibility. Moreover, because the silicon belt is soft, there is no risk of damaging the glass ribbon G. In addition, in order to smoothly transmit the drive to the glass ribbon G without causing the slip between the glass ribbon G and belt 19, it is favorable that the wheel 20 for keeping down the glass ribbon G is provided directly above the belt 19 and is caused to be in contact with the glass ribbon G so as to press down the glass ribbon G from above, and thereby the glass ribbon G is reliably supported in a sandwiched state between the belt 19 and the wheel 20. Accordingly, the slip between the glass ribbon G and the belt 19 is suppressed, and the drive force derived from the rolls 18 is certainly transmitted to the glass ribbon G. As shown in FIG. 5B, it is favorable that a balance structure (weighing-machine structure) movable about a fulcrum 21 is used, and thereby a pressing force of wheel 20 which is applied to the glass ribbon G is freely adjusted by a location of the fulcrum 21 and masses of the wheel 20, an arm 22 and a weight 23. Thereby, a constant pressing force can be obtained which acts on the glass ribbon G during the carrying (conveyance) of glass ribbon G.

Moreover, since the conveyance assisting device 16 is disposed at the width-directional both end portions 15 of glass ribbon G, a rotation speed of outer circumference of the belt 19 can be adjusted independently at each of the both end portions 15 by an increase/decrease of the drive force of the motor functioning as the rotary drive section 17, so as to prevent the snaking movement and the like of glass ribbon G. Moreover, by setting the conveying speed of glass ribbon G which is produced by the conveyance assisting device 16 at a somewhat larger value than the conveying speed of glass ribbon G which is produced by the rotation of glass conveyance rolls 9 inside the slow-cooling furnace 8, the glass ribbon G can be maintained under a tight (stretched) state. Accordingly, there is no fear of failure such as a trouble that the glass ribbon G sags and thereby breaks.

(Advantageous Effects According to the Present Invention)

The glass-ribbon conveyance assisting device according to the present invention is provided at the location of the width-directional both end portions of glass ribbon G which has become in the cooled state inside the slow-cooling furnace, more preferably, which exists in the exit of slow-cooling furnace. Moreover, the conveying speed of glass ribbon generated by the conveyance assisting device is made faster than the speed of outer circumference of glass conveyance roll generated by the rotary drive of glass conveyance roll inside the slow-cooling furnace. Thereby, it is suppressed that the slip occurs between the glass ribbon and the glass conveyance rolls so that, for example, the glass conveyance rolls spin freely to cause the sag of glass ribbon. Accordingly, the glass ribbon can be maintained in the tight (stretched) state inside the slow-cooling furnace, resulting in a remarkable reduction of breakage of the glass ribbon. Moreover, the glass-ribbon conveyance assisting device according to the present invention which is provided at the both end portions of glass ribbon adjusts the glass conveying speed by the both end portions, and thereby, a swing of glass ribbon is adjusted during the conveyance of glass ribbon.

Moreover, in the case that the top rolls for drawing and enlarging the glass are used in order to reduce the thickness of glass ribbon in the manufacturing facility of glass according to the float method, thick portions are formed at the both end portions of glass ribbon. The glass-ribbon conveyance assisting device according to the present invention which is provided at the both end portions of glass ribbon sandwiches these thick both end portions between the belts and the wheels, and moves the glass ribbon on the belt by means of drive of the belt. Accordingly, drive force can be reliably transmitted to the glass ribbon without breaking the glass ribbon.

The invention claimed is:

1. A glass-ribbon conveyance assisting device which is applied to a glass-ribbon conveyance device configured to convey a glass ribbon on a plurality of rotating glass-conveyance rolls of a cooling furnace provided downstream of a glass melting furnace of a glass manufacturing facility, the glass-ribbon conveyance assisting device comprising:
   a rotary drive section;
   a plurality of rolls configured to be rotated by the rotary drive section;
   an annular belt configured to rotate while running with flexion under a state where the rolls have been inserted into the belt; and
   a wheel configured to press the glass ribbon to the belt,
   wherein the glass ribbon is formed by being taken out from the melting furnace and is cooled by the cooling furnace,
   wherein the belt and the wheel are located at a width-directional end portion of the cooled glass ribbon such that the cooled glass ribbon is conveyed on the belt by a drive of the belt under a state where each of width-directional both end portions of the cooled glass ribbon is sandwiched between the belt and the wheel, and
   wherein the belt is configured to convey the cooled glass ribbon at a speed higher than a conveying speed generated by the plurality of rotating glass-conveyance rolls of the cooling furnace.

2. A glass-ribbon conveyance method in which a glass ribbon having a thickness falling within a range from 0.3 mm to 3.0 mm is conveyed on a plurality of rotating glass-conveyance rolls of a cooling furnace provided downstream of a glass melting furnace of a glass manufacturing facility, the glass-ribbon conveyance method comprising:
   providing a glass-ribbon conveyance assisting device in addition to a rotary drive of the glass conveyance rolls configured to convey the glass ribbon under a state where the glass ribbon is on the plurality of glass conveyance rolls, the glass-ribbon conveyance assisting device including an annular belt configured to rotate on annular belt rolls while running with flexion and a wheel configured to press the glass ribbon to the belt, wherein the belt and the wheel are located at a width-directional end portion of the cooled glass ribbon such that the cooled glass ribbon is conveyed on the belt by a drive of the belt under a state where each of width-directional both end portions of the cooled glass ribbon is sandwiched between the belt and the wheel, the glass ribbon is formed by being taken out from the melting furnace and is cooled by the cooling furnace, and the belt is configured to convey the cooled glass ribbon at a speed higher than a conveying speed generated by the plurality of rotating glass-conveyance rolls of the cooling furnace,
   sandwiching the glass ribbon by means of the conveyance assisting device; and
   adjusting a conveying speed of the glass ribbon by the conveyance assisting device.

3. The glass-ribbon conveyance method according to claim 2, wherein
   the glass-ribbon conveyance assisting device is provided in a cooling furnace of a glass manufacturing facility or at a location posterior to an exit of the cooling furnace.

4. The glass-ribbon conveyance method according to claim 3, wherein
the conveyance assisting device adjusts the conveying speed of the glass ribbon to a value faster than a speed of an outer circumference of each glass conveyance roll that is generated by the rotary drive of the glass conveyance rolls inside the cooling furnace.

* * * * *